US008774496B2

(12) United States Patent
Pavlovich et al.

(10) Patent No.: US 8,774,496 B2
(45) Date of Patent: Jul. 8, 2014

(54) COMPOUND OBJECT SEPARATION

(75) Inventors: Julia Pavlovich, Cambridge, MA (US); Sergey Simanovsky, Brookline, MA (US); Zhengrong Ying, Belmont, MA (US); Ram Naidu, Newton, MA (US)

(73) Assignee: Analogic Corporation, Peabody, MA (US)

( * ) Notice: Subject to any disclaimer, the term of this patent is extended or adjusted under 35 U.S.C. 154(b) by 148 days.

(21) Appl. No.: 13/387,502

(22) PCT Filed: Jul. 29, 2009

(86) PCT No.: PCT/US2009/052031
§ 371 (c)(1),
(2), (4) Date: Jan. 27, 2012

(87) PCT Pub. No.: WO2011/014163
PCT Pub. Date: Feb. 3, 2011

(65) Prior Publication Data
US 2012/0121168 A1    May 17, 2012

(51) Int. Cl.
*G06K 9/00* (2006.01)
(52) U.S. Cl.
USPC ........................................... 382/154
(58) Field of Classification Search
None
See application file for complete search history.

(56) References Cited

U.S. PATENT DOCUMENTS

| | | | |
|---|---|---|---|
| 6,067,366 A * | 5/2000 | Simanovsky et al. | 382/100 |
| 6,078,642 A | 6/2000 | Simanovsky et al. | |
| 6,128,365 A | 10/2000 | Bechwati et al. | |
| 6,317,509 B1 * | 11/2001 | Simanovsky et al. | 382/131 |
| 6,345,113 B1 | 2/2002 | Crawford et al. | |
| 7,031,430 B2 | 4/2006 | Kaucic, Jr. et al. | |
| 7,539,337 B2 | 5/2009 | Simanovsky et al. | |
| 2007/0014471 A1 * | 1/2007 | Simanovsky et al. | 382/170 |
| 2009/0154641 A1 * | 6/2009 | Thielemans | 378/21 |
| 2009/0208082 A1 * | 8/2009 | Westerhoff et al. | 382/131 |

OTHER PUBLICATIONS

International Search Report cited in related application No. PCT/US2009/052031 dated Apr. 16, 2010.
Hu; et al., "Statistical 3D Segmentation with Greedy Connected Component Labelling Refinement", Bioengineering Dept., PRISM Lab, and Computer Science Dept., Arizona State University, No. 7912539, Published 2003, Retrieved at:: http://l3dea.asu.edu/publications.

* cited by examiner

*Primary Examiner* — Stephen R Koziol
*Assistant Examiner* — Delomia Gilliard
(74) *Attorney, Agent, or Firm* — Cooper Legal Group LLC

(57) ABSTRACT

Representations of an object in an image generated by an imaging apparatus can comprise two or more separate sub-objects, producing a compound object. Compound objects can negatively affect the quality of object visualization and threat identification performance. As provided herein, a compound object can be separated into sub-objects. Topology score map data, representing topological differences in the potential compound object, may be computed and used in a statistical distribution to identify modes that may be indicative of the sub-objects. The identified modes may be assigned a label and a voxel of the image data indicative of the potential compound object may be relabeled based on the label assigned to a mode that represents data corresponding to properties of a portion of the object that the voxel represents to create image data indicative of one or more sub-objects.

20 Claims, 5 Drawing Sheets

COMPOUND OBJECT SEPARATION

BACKGROUND

The present application relates to the field of x-ray and computed tomography (CT). It finds particular application with CT security scanners. It also relates to medical, security, and other applications where identifying sub-objects of a compound object would be useful.

Security at airports and in other travel related areas is an important issue given today's sociopolitical climate, as well as other considerations. One technique used to promote travel safety is baggage inspection. Often, an imaging apparatus is utilized to facilitate baggage screening. For example, a CT device may be used to provide security personnel with two and/or three dimensional views of objects. After viewing images provided by the imaging apparatus, security personnel may make a decision as to whether the baggage is safe to pass through the security check-point or if further (hands-on) inspection is warranted.

Current screening techniques and systems can utilize automated object recognition in images from an imaging apparatus, for example, when screening for potential threat objects inside luggage. These systems can extract an object from an image, and compute properties of these extracted objects. Properties of scanned objects can be used for discriminating an object by comparing the objects properties (e.g., density, shape, etc.) with known properties of threat items, non-threat items, and/or both classes of items. It can be appreciated that an ability to discriminate potential threats may be reduced if an extracted object comprises multiple distinct physical objects. Such an extracted object is referred to as a compound object.

A compound object can be made up of two or more distinct items. For example, if two items are lying side by side and/or touching each other, a security scanner system may extract the two items as one single compound object. Because the compound object actually comprises two separate objects, however, properties of the compound object may not be able to be effectively compared with those of known threat and/or non-threat items. As such, for example, luggage containing a compound object may unnecessarily be flagged for additional (hands-on) inspection because the properties of the compound object resemble properties of a known threat object. This can, among other things, reduce the throughput at a security checkpoint. Alternatively, a compound object that should be inspected further may not be so identified because properties of a potential threat object in the compound object are "contaminated" or combined with properties of one or more other (non-threat) objects in the compound object, and these "contaminated" properties (of the compound object) might more closely resemble those of a non-threat object than those of a threat object, or vice versa.

Compound object splitting can be applied to objects in an attempt to improve threat item detection, and thereby increase the throughput and effectiveness at a security check-point. Compound object splitting essentially identifies potential compound objects and splits them into sub-objects. Compound object splitting involving components with different densities may be performed using a histogram-based compound object splitting algorithm. Other techniques include using surface volume erosion to split objects. However, using erosion as a stand-alone technique to split compound objects can lead to undesirable effects. For example, erosion can reduce a mass of an object, and indiscriminately split objects that are not compound, and/or fail to split some compound objects. Additionally, in these techniques, erosion and splitting may be applied indiscriminately/universally, without regard to whether an object is a potential compound object at all.

SUMMARY

Aspects of the present application address the above matters, and others. According to one aspect, a method for splitting a compound object is provided. The method comprises using topology score map data to yield image data indicative of one or more sub-objects from image data indicative of a potential compound object.

According to another aspect, an apparatus for compound object splitting is provided. The apparatus comprises a distribution component configured to generate a statistical distribution of object voxels using topology score map data derived from image data indicative of a potential compound object under examination. The apparatus also comprises a segmentation component configured to identify modes in the statistical distribution. The apparatus further comprises a relabeler configured to label voxels of the image data indicative of the potential compound object according to the identified modes to generate image data indicative of one or more sub-objects.

According to another aspect, a method is provided. The method comprises generating topology score map data from three-dimensional image data indicative of a potential compound object and creating a multivariate distribution of object voxels using at least the topology score map data and another property of the potential compound object. The method also comprises segmenting the multivariate distribution of object voxels to identify modes in the multivariate distribution. The method also comprises labeling voxels of the three-dimensional image data indicative of the potential compound object according to the identified modes to create three-dimensional image data indicative of one or more sub-objects.

Those of ordinary skill in the art will appreciate still other aspects of the present invention upon reading and understanding the appended description.

DETAILED DESCRIPTION

Figure 1:
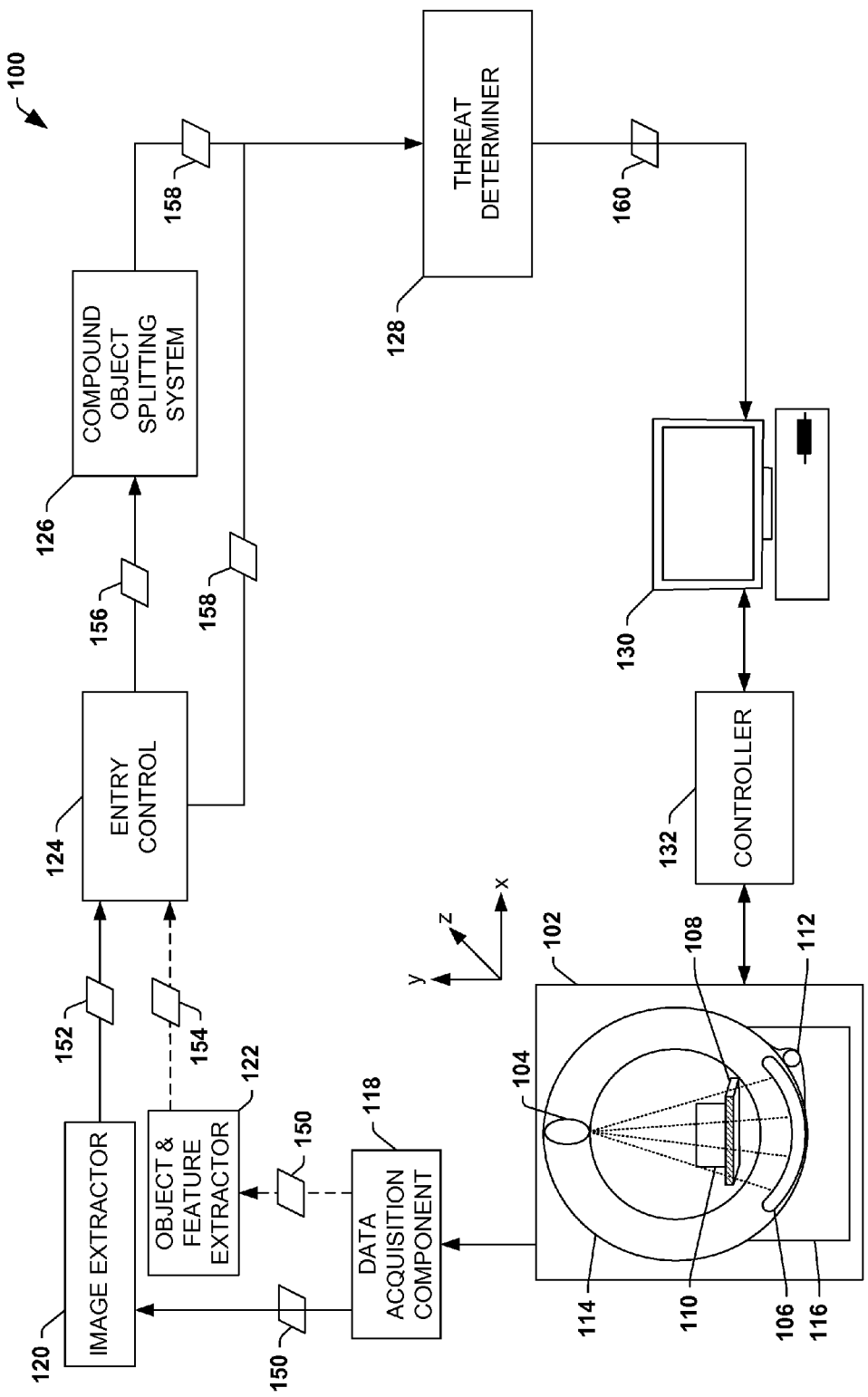
FIG. 1 is a schematic block diagram illustrating an example scanner.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are illustrated in block diagram form in order to facilitate describing the claimed subject matter.

Systems and techniques for separating a compound object representation into sub-objects in an image generated by subjecting one or more objects to imaging using an imaging apparatus (e.g., a computed tomography (CT) image of a piece of luggage under inspection at a security station at an airport) are provided herein. That is, in one embodiment, techniques and systems for splitting compound objects into distinct sub-objects.

FIG. 1 is an illustration of an example environment 100 in which a system may be employed for identifying potential threat containing objects, from a class of objects, inside a container that has been subjected to imaging using an imaging apparatus (e.g., a CT scanner). In the example environment 100 the imaging apparatus comprises an object scanning apparatus 102, such as a security scanning apparatus (e.g., used to scan luggage at an airport). The scanning apparatus 102 may be used to scan one or more objects 110 (e.g., a series of suitcases at the airport). The scanning apparatus typically comprises a rotating gantry portion 114 and a stationary gantry portion 116.

The rotating gantry portion 114 comprises a radiation source 104 (e.g., an X-ray tube), an array of radiation detectors 106 (e.g., X-ray detectors), and a rotator 112 (e.g., a gantry motor) for rotating the rotating gantry portion 114 (e.g., including the radiation source 104 and detectors 106) around the object(s) being scanned 110. An examination surface 108 (e.g., a conveyor belt) passes through a hole in the rotating gantry portion 114 and may be configured to convey the object(s) 110 from an upstream portion of the object scanning apparatus 102 to a downstream portion (e.g., moving the object in substantially a z-dimension).

As an example, a computed tomography (CT) security scanner 102 that includes an X-ray source 104, such as an X-ray tube, can generate a fan, cone, wedge, or other shaped beam of radiation that traverses one or more objects 110, such as suitcases, in an examination region. In this example, the X-rays are emitted by the source 104, traverse the examination region that contains the object(s) 110 to be scanned, and are detected by an X-ray detector 106 across from the X-ray source 104. Further, a rotator 112, such as a gantry motor drive attached to the scanner 102, can be used to rotate the X-ray source 104 and detector 106 around the object(s) 110, for example. In this way, X-ray projections from a variety of perspectives of the suitcase can be collected, for example, creating a set of X-ray projections for the object(s). While illustrated with the x-ray source 104 and detector 106 rotating around an object, in another example, the radiation source 104 and detector 106 may remain stationary while the object 110 is rotated.

In the example environment 100, a data acquisition component 118 is operably coupled to the scanning apparatus 102, and is typically configured to collect information and data from the detector 106, and may be used to compile the collected data into projection space data 150 for an object 110. As an example, X-ray projections may be acquired at each of a plurality of angular positions with respect to the object 110. Further, as the object(s) 110 is conveyed from an upstream portion of the object scanning apparatus 102 to a downstream portion (e.g., conveying objects parallel to the rotational axis of the scanning array (into and out of the page)), the plurality of angular position X-ray projections may be acquired at a plurality of points along the axis of rotation with respect to the object(s) 110. In one embodiment, the plurality of angular positions may comprise an X and Y axis with respect to the object(s) being scanned, while the rotational axis may comprise a Z axis with respect to the object(s) being scanned.

In the example environment 100, an image extractor 120 is coupled to the data acquisition component 118, and is configured to receive the data 150 from the data acquisition component 118 and generate three-dimensional image data 152 indicative of the scanned object 110 using a suitable analytical, iterative, and/or other reconstruction technique (e.g., backprojecting from projection space to image space).

In one embodiment, the three-dimensional image data 152 for a suitcase, for example, may ultimately be displayed on a monitor of a terminal 130 (e.g., desktop or laptop computer) for human observation. In this embodiment, an operator may isolate and manipulate the image, for example, rotating and viewing the suitcase from a variety of angles, zoom levels, and positions.

It will be appreciated that, while the example environment 100 utilizes the image extractor 120 to extract three-dimensional image data from the data 150 generated by the data acquisition component 118, for example, for a suitcase being scanned, the techniques and systems, described herein, are not limited to this embodiment. In another embodiment, for example, three-dimensional image data may be generated by an imaging apparatus that is not coupled to the system. In this example, the three-dimensional image data may be stored onto an electronic storage device (e.g., a CD-ROM, hard-drive, flash memory) and delivered to the system electronically.

In the example environment 100, in one embodiment, an object and feature extractor 122 may receive the data 150 from the data acquisition component 118, for example, in order to extract objects and features 154 from the scanned items(s) 110 (e.g., a carry-on luggage containing items). It will be appreciated that the systems, described herein, are not limited to having an object and feature extractor 122 at a location in the example environment 100. For example, the object and feature extractor 122 may be a component of the image extractor 120, whereby three-dimensional image data 152 and object features 154 are both sent from the image extractor 120. In another example, the object and feature extractor 122 may be disposed after the image extractor 120 and may extract object features 154 from the three-dimensional image data 152. Those skilled in the art may devise alternative arrangements for supplying three-dimensional image data 152 and object features 154 to the example system.

In the example environment 100, an entry control 124 may receive three-dimensional image data 152 and object features 154 for the one or more scanned objects 110. The entry control 124 can be configured to identify a potential compound object in the three-dimensional image data 152 based on an object's features. In one embodiment, the entry control 124 can be utilized to select objects that may be compound objects 156 for processing by a compound object splitting system 126. In one example, object features 154 (e.g., properties of an object in an image, such as an Eigen-box fill ratio) can be computed prior to the entry control 120 and compared with pre-determined features for compound objects (e.g., features extracted from known compound objects during training of a system) to determine whether the one or more objects are compound objects. In another example, the entry control 124 calculates an average density and a standard deviation of a potential compound object. If the standard deviation is outside a predetermined range, the entry control 124 may identify the object as a potential compound object. Objects that are not determined to be potential compound objects by the entry control 124 may not be sent through the compound object splitting system 126.

In the example environment 100, the compound object splitting system 126 receives three-dimensional image data indicative of a potential compound object 156 (e.g., voxel data) from the entry control 124. The compound object splitting system 126 is configured to label voxels of the three-dimensional image data indicative of the potential compound object 156 based on topology score map data generated from the three-dimensional image data indicative of the potential compound object 156. Labeling the voxels based on the topology score map data (and optionally other data) converts the three-dimensional image data indicative of the potential compound object into three-dimensional image data indicative of one or more sub-objects 158.

The topology scope map data represents the topological differences in the potential compound object. It will be appreciated that the terms "topological differences" are used herein to refer to the thickness or thinness of an object, wherein the thickness or thinness of an object is defined by a value of a first dimension (e.g., width, depth, height, etc.) of the object relative to the other two-dimensions of the object. For example, a "thin" object may be defined to be an object that is significantly smaller (e.g., shorter) in one dimension than it is it in other dimensions. Similarly, "topology score" may be defined as the value assigned to a voxel based on the probability, or likelihood, that a voxel is indicative of a thin or thick object relative to the probability that one or more neighboring voxels are indicative of a thin or thick object. It will be appreciated, however, that generally speaking a "topology score" is a metric that could refer to other properties, such as a curvature, radius, etc. for example. That is, a thinness/thickness score is merely one example of what a topology score could measure (e.g., rather than all topology scores being indicative of a thickness/thinness). Nevertheless, for purposes of this patent application, and as used herein, topology score is generally meant to comprise a statistical measurement of a voxel indicative of how likely it is that that voxel belongs to a thin or thick object. In one embodiment, the compound object splitting system 126 is configured to generate a topology score map of the potential object using suitable analytic, iterative, or other techniques known to those skilled in the art (e.g., constant false alarm rate (CFAR)). In this way, a first portion of the potential compound object having a first topology score range can be identified as a first sub-object and a second portion of the potential compound object having a second topology score range that is different that the first topology score range can be identified as a second sub-object, for example.

In the example environment 100, a threat determiner 128 can receive image data for an object, which may comprise image data indicative of sub-objects 158. The threat determiner 128 can be configured to compare the image data to one or more pre-determined thresholds, corresponding to one or more potential threat objects. It will be appreciated that the systems and techniques provided herein are not limited to utilizing a threat determiner 128, and may be utilized for separating compound objects without a threat determiner. For example, image data for an object may be sent to a terminal 130 wherein an image of the object under examination 110 may be displayed for human observation.

Information concerning whether a scanned object is potentially threat containing and/or information concerning sub-objects 160 can be sent to a terminal 130 in the example environment 100, for example, comprising a display that can be viewed by security personal at a luggage screening checkpoint. In this way, in this example, real-time information can be retrieved for objects subjected to scanning by a security scanner 102.

In the example environment 100, a controller 132 is operably coupled to the terminal 130. The controller 132 receives commands from the terminal 130 and generates instructions for the object scanning apparatus 102 indicative of operations to be performed. For example, a human operator may want to rescan the object 110 and the controller 132 may issue an instruction instructing the examination surface 108 to reverse direction (e.g., bringing the object back into an examination region of the object scanning apparatus 102).

Figure 2:
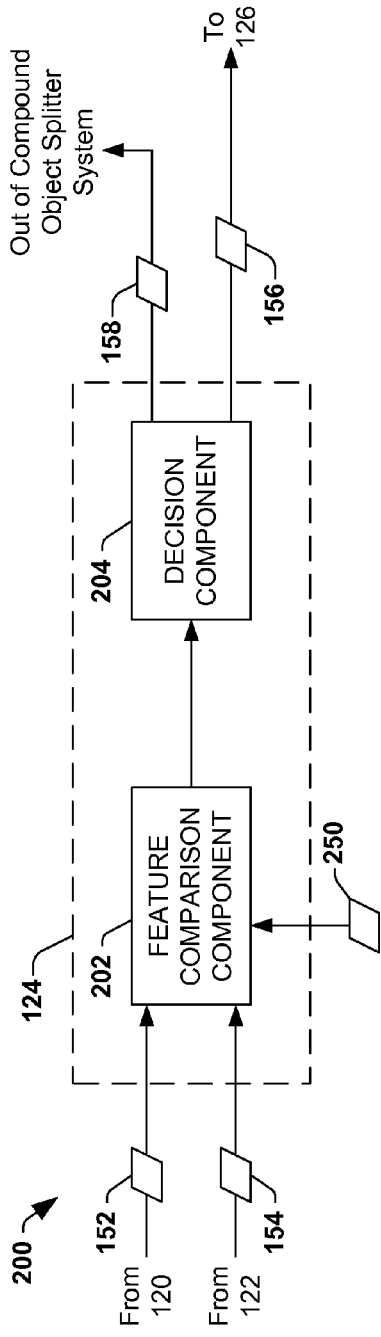
FIG. 2 is a component block diagram illustrating one or more components of an environment wherein compound object splitting of objects in an image may be implemented as provided herein.

FIG. 2 is a component block diagram illustrating one embodiment 200 of an entry control 124, which can be configured to identify a potential compound object based on an object's features. The entry control 124 can comprise a feature threshold comparison component 202, which can be configured to compare the respective one or more feature values 154 to a corresponding feature threshold 250.

In one embodiment, image data 152 for an object in question can be sent to the entry control 124, along with one or more corresponding feature values 154. In this embodiment, feature values 154 can include, but not be limited to, an object's shape properties, such as an Eigen-box fill ratio (EBFR) for the object in question. As an example, objects having a large EBFR typically comprise a more uniform shape; while objects having a small EBFR typically demonstrate irregularities in shape. In this embodiment, the feature threshold comparison component 202 can compare one or more object feature values with a threshold value for that object feature, to determine which of the one or more features indicate a compound object for the object in question. In another embodiment, the feature values 154 can include properties related to the average density of the object and/or the standard deviation of densities of portions of the object. The feature threshold comparison component 202 may compare the standard deviation of the densities to a threshold value to determine whether a compound object may be present.

In the example embodiment 200, the entry control 124 can comprise an entry decision component 204, which can be configured to identify a potential compound object based on results from the feature threshold comparison component 202. In one embodiment, the decision component 204 may identify a potential compound object based on a desired number of positive results for respective object features, the positive results comprising an indication of a potential compound object. As an example, in this embodiment, a desired number of positive results may be one hundred percent, which means that if one of the object features indicates a non-compound object, the object may not be sent to be separated (e.g., the data indicative of the non-compound object 158 may be transmitted to the threat determiner 128). However, in this example, if the object in question has the desired number of positive results (e.g., all of them) then the image data for the potential compound object can be sent for separation 156. In another example, the entry decision component 204 may identify a potential compound object when the standard deviation exceeds a predefined threshold at the threshold comparison component 202.

Figure 3:
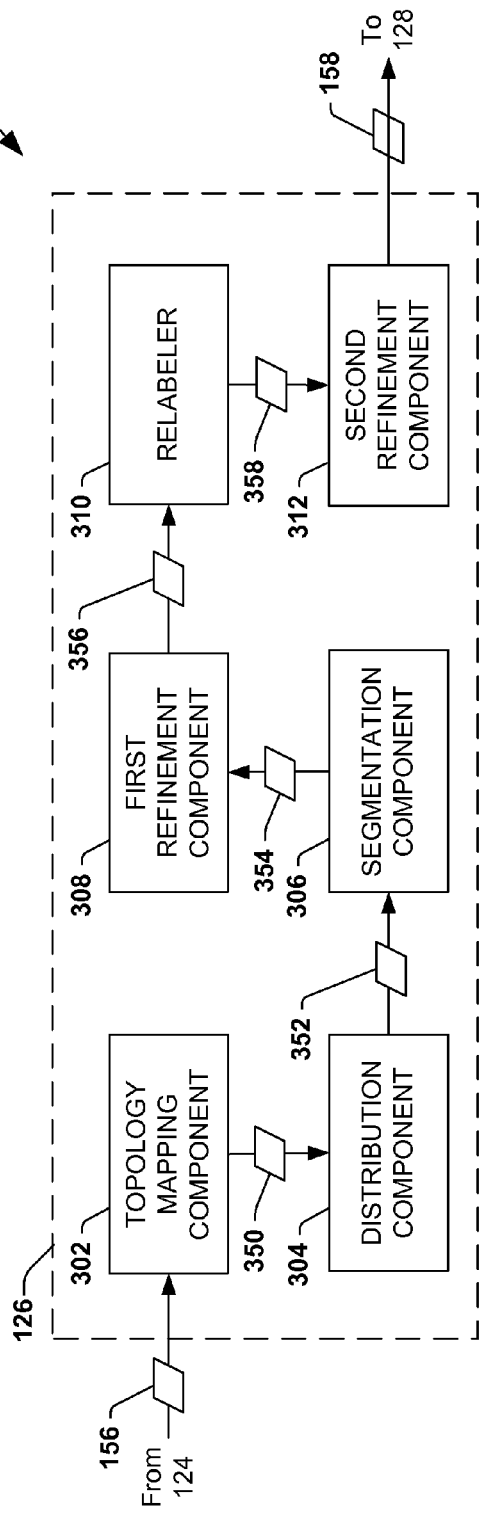
FIG. 3 is a component block diagram illustrating details of one or more components of an environment wherein compound object splitting of objects in an image may be implemented as provided herein.

FIG. 3 is a component block diagram of one example embodiment 300 of a compound object splitting system 126, which can be configured to generate three-dimensional image data 158 indicative of sub-objects from three-dimension image data 156 indicative of a potential compound object.

The example embodiment of the compound object splitter system 126 comprises a topology mapping component 302 configured to receive three-dimensional image data indicative of a potential compound object 156 under examination from a entry control component (e.g., 124 in FIG. 1), for example. The topology mapping component 302 is also configured to generate topology score map data 350 representing topological differences of the potential compound object, for example, from the three-dimensional image data indicative of the potential compound object 156. Stated differently, the topology mapping component 302 is configured to determine a topology value for respective voxels of the three-dimensional image data 156. In this way, the density, for example, of a first portion of the potential compound object represented by a voxel can be determined relative to the density of neighboring voxels (representing neighboring portions of the potential compound object).

In one example, a constant false alarm rate (CFAR) technique know to those skilled in the art may be used to generate the topology score map data 350. Generally, the CFAR technique typically comprises calculating the mean and standard deviation of a property, such as density or atomic number, for portions of the potential compound object represented by voxels neighboring a test voxel (e.g., a voxel under examination). A topology value is then assigned to the test voxel by subtracting the property of the test voxel from the mean and then dividing by the standard deviation plus a factor (e.g., a small constant that is used to ensure that the denominator is not zero). These acts may be repeated for a plurality of test voxels. It will be appreciated that other techniques for generating topology score map data 350 known to those skilled in the art may be used in conjunction with, or instead of, the CFAR technique herein described.

In the example embodiment 300, the compound object splitter system 126 further comprises a distribution component 304 configured to receive the topology score map data 350 and to generate statistical distribution data 352 of object voxels using the topology score map data 350. It will be appreciated that the distribution represents the data of object voxels (e.g., density values, atomic number values, topology score map data, etc), and thus, a single point on the distribution may be representative of a plurality of object voxels (e.g., each voxel having similar values for the one or more variables represented on the distribution) but a voxel may not be represented by more than one point on the distribution (e.g., a voxel may have only one density value, topology scope map value, etc.).

In one example, the statistical distribution is a multivariate distribution comprising "n" number of variables, where "n" is an integer greater than zero. For example, a first dimension of the multivariate distribution may represent a distribution of the topology score map data 350, a second dimension may represent a distribution of another property of the object (and represented by the respective voxels), such as density and/or atomic number (if the object scanning apparatus 102 is a dual-energy scanner), and a third dimension may be height, or frequency, for example.

Stated differently, where a multivariate distribution is generated, at least two properties of the potential compound object, which may be derived from the three-dimension image data indicative of the potential compound object 156, may be used as variables in the distribution. A first property that may be used for the distribution is the topology value assigned to respective voxels (by the topology mapping component 302), and a second property may be the density and/or atomic number, for example, that is assigned to respective voxels (based upon the radiation absorbed by the portion of the potential compound object that the voxel is representing).

It will be appreciated that, where the distribution component 304 is configured to generate a multivariate distribution, the data used for the distribution, other than the topology values which are contained in the topology score map data 350, may come from a source external to the compound object splitting system 126. For example, the distribution component 304 may be configured to receive the three-dimensional image data indicative of the potential compound object 156 (which may comprise data indicative of the density of respective voxels) from the entry control 124.

In another embodiment, the topology score map data 350 comprises both the topology values and the three-dimensional image data indicative of the potential compound object 156 (e.g., the topology values are simply added to the three-dimensional image data 156). Stated differently, the distribution component 304 receives (all) the data that is used to generate the distribution from the topology mapping component 302.

The example embodiment 300 further comprises a segmentation component 306 configured to receive the distribution data 352 and output segmented distribution data 354. To generate the segmented distribution data 354, the segmentation component 306 is configured to segment, or identify modes (e.g., peaks), in the (multivariate) distribution 352 using analytical, iterative, or other statistical segmenting techniques known to those skilled in the art (e.g., a mean-shirt type of algorithm or other hill-climbing algorithm). Such peaks or modes in the distribution may be indicative of potential sub-objects and thus, identifying the modes may assist in identifying sub-objects, for example.

The example embodiment 300 also comprises a first refinement component 308 configured to receive the segmented distribution data 354 from the segmentation component 306. The first refinement component 308 can also be configured to refine the segmented distribution by reducing the number of modes in the segmented distribution 354. Stated differently, the first refinement component 308 is configured to dissolve modes that do not meet predetermined criteria. In one example, the first refinement component 308 dissolves weak peaks (e.g., a peaks adjacent to another peak with a larger height) and/or combines data associated with one or more weak peaks with a more dominate peak (e.g., a peak with a larger height relative to the weak peak). In this way, peaks that are not likely to be sub-objects but rather small composition variations in a sub-object are not identified as a sub-object, for example. If such peaks are not dissolved, more sub-objects may be identified than there actually are in the potential compound object.

Refined distribution data 356, output from the first refinement component 308, is transmitted to a relabeler 310 in the example embodiment 300. The relabeler 310 is configured to relabel voxels of the three-dimension image data indicative of the potential compound object 156 according to the peaks in the refined distribution 356. For example, if the properties that are included in the distribution (e.g., the topology score and density) for a portion of the object that is represented by a first voxel are included in a first hill, the first voxel may be labeled "1" and if the properties are included in a second hill different than the first hill, the first voxel may be labeled "2." In this way, the three-dimensional data indicative of the potential compound object 156 becomes three-dimensional data indicative of one or more sub-objects 358.

Stated differently, voxels are generally labeled as being associated with an object. For example, if ten objects are identified in a suitcase, voxels associated with a first object may be labeled "1," voxels associated with a second object may be labeled "2," etc. If the second object, for example, is identified as a potential compound object, the data indicative of the second object (e.g., the three-dimensional data indicative of the potential compound object 156), including the voxels labeled "2," may be transmitted to the compound object splitting system 126. The voxels, originally labeled "2," may be relabeled by the relabeler 310. For example, if the first refinement component 308 identifies three dominant peaks (e.g., indicative of three sub-objects), the relabeler 310 may label voxels associated with a first "hill" of the distribution (because the voxel is represented by a point that falls within the first "hill") with label "2," voxels associated with a second "hill" of the distribution with a label "11" (e.g., since there were already ten objects identified in the suitcase), and voxels associated with a third "hill" of the distribution with a label "12." It will be appreciated that voxels are associated with a "hill" of the distribution based upon a point that is representative of the voxel. For example, if a first point is representative of a first voxel (e.g., because the first point is at coordinates matching the density and topological score of the first voxel) and the first point falls within a hill with a label of "3," the first voxel may be labeled "3". By relabeling the voxels as describes herein the relabeler 310 may cause twelve objects to be identified rather than the original ten objects that were identified from the suitcase.

It will be appreciated that the three-dimensional image data indicative of the potential object 156 may be transmitted to the relabeler 310 from a source external to the compound object splitting system 126 (e.g., from the entry control 124) and/or the three-dimensional image data 156 may be part of the data that is passed through the compound object splitting system 126 (e.g., the three-dimensional image data indicative of the potential object 156 may be part of the topology score map data 350, the distribution data 352, the segmented distribution data 354, and/or the refined distribution data 356). Regardless of how the relabeler 310 receives the three-dimensional data indicative of the potential compound object, once received, the relabeler is configured to relabel voxels of the three-dimensional data indicative of the potential compound object based upon the modes in the refined distribution data 356.

In the example embodiment 300, the compound object splitting system 126 also comprises a second refinement component 312 configured to receive the three-dimensional data indicative of one or more sub-objects 354. The second refinement component 312 is also configured to refine the three-dimensional data indicative of one or more sub-objects 358 by verifying that the voxels are labeled correctly. In one example, the second refinement component 312 uses connectivity analysis to verify that a first voxel, having a first label, is within a predetermined geometric proximity of a cluster of voxels that also have the first label. If a cluster of the voxels that are identified as being associated with a first sub-object (e.g., baring the first label) are in an identifiable geometric region, but one or more (e.g., a relatively small number) of the voxels are outside of the identifiable region (e.g., the voxels are not geometrically connected to other voxels associated with the sub-object), the voxels outside of the identifiable region may be relabeled by the second refinement component 312 to correspond to a sub-object that has a similar geometric position as the voxels and/or to correspond to the background (e.g., the voxels may be labeled as "0"). In this way, the likelihood that a voxel labeled accurately may be improved and thus a resulting image, for example, from the voxels may be improved (e.g., there may be fewer artifacts).

The (refined) three-dimensional image data indicative of the sub-objects 158, may be displayed on a monitor of a terminal (e.g., 130 in FIG. 1) and/or transmitted to a threat determiner (e.g., 128 in FIG. 1) that is configured to identify threats according to the properties of an object. Because the compound object has been divided into sub-objects, the threat determiner may better discern the characteristics of an object and thus may more accurately detect whether an object is a threat or a non-threat, for example.

A method may be devised for separating a compound object into sub-objects in an image generated by an imaging apparatus. In one embodiment, the method may be used by a threat determination system in a security checkpoint that screens passenger luggage for potential threat items. In this embodiment, an ability of a threat determination system to detect potential threats may be reduced if compound objects are introduced, as computed properties of the compound object may not be specific to a single physical object. Therefore, one may wish to separate the compound object into distinct sub-objects of which it is comprised.

Figure 4:
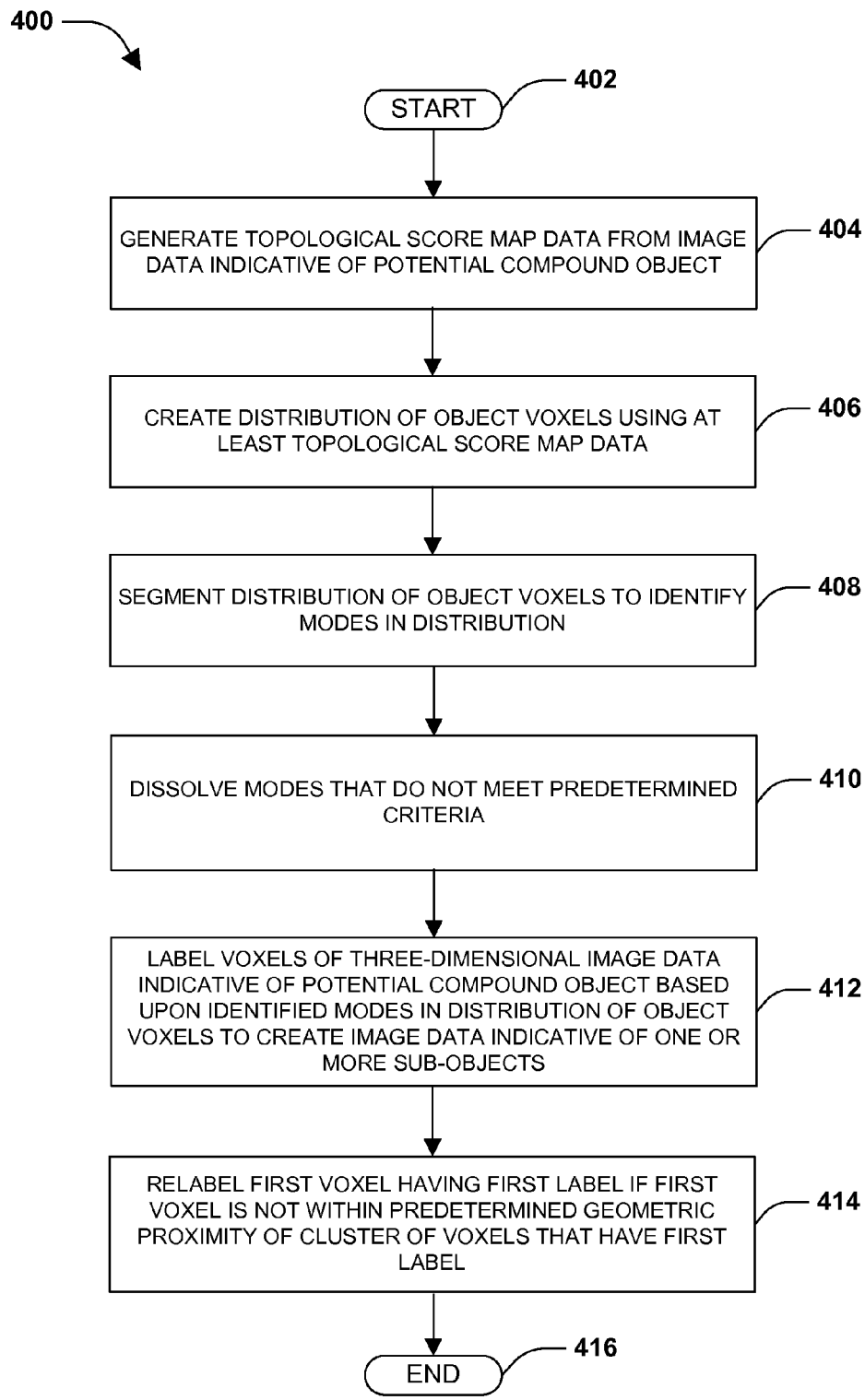
FIG. 4 is a flow chart diagram of an example method for compound object splitting.

FIG. 4 is a flow chart diagram of an example method 400. Such an example method 400 may be useful for splitting a potential compound object, for example. The method begins at 402 and involves generating topology score map data from image data indicative of a potential compound object at 404. In one embodiment, the image data is three-dimensional and similar to the image data that may be acquired from a computed tomography (CT) scan of the potential compound object.

Figure 5:
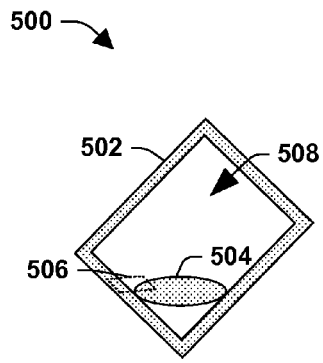
FIG. 5 is a graphical representation of image data indicative of a potential compound object.

FIG. 5 is an illustration of image data of a potential compound object 500 (shaded in dots). The potential compound object comprises a frame-like portion 502 and an oval-like portion 504. The non-shaded area 508 represents background (e.g., a portion of the image data that does not contain the object) It will be appreciated that while the image data of the potential compound object 500 appears to be two-dimensional, the image data may actually be three-dimensional (e.g., with the third dimension going into the page).

The topology score map data identifies the topology of the potential compound object by comparing the likelihood, or probability, of a test voxel (e.g., a voxel under examination) being associated with a thick or thin object relative to the likelihood that other voxels spatially nearby the test voxel are indicative of a thick or thin object using techniques known to those skilled in the art (e.g., a CFAR technique). In one example, generating the topology score map data comprises calculating the mean density and the standard deviation for voxels neighboring the test voxel. The density of the test voxel, or rather the density of a portion of the potential compound object that is represented by the voxel, may then be subtracted from the mean density. This value may then be divided by the standard deviation plus a factor (in case the standard deviation is zero) to determine a topology value that may be assigned to the test voxel. The acts of subtracting and dividing may be repeated for a plurality of voxels to generate the topology score map data (e.g., where each voxel on the map comprises a topology score assigned to the given voxel).

Figure 6:
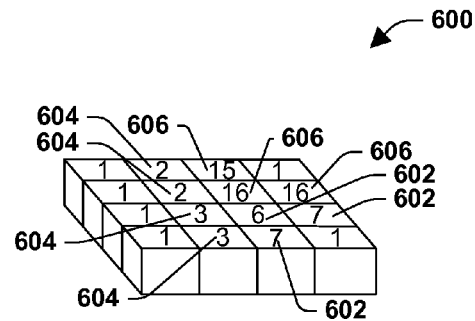
FIG. 6 is a graphical representation of voxels that are assigned a topology value.

FIG. 6 illustrates a graphical illustration of voxels 600 comprising topology values representing a portion (e.g., outlined by the dashed lines 506 in FIG. 5) of the image data of the potential compound object 500. For illustrative purposes, only a single layer (e.g., a surface layer) of voxels is shown with topology values. However, in three-dimensional image space, numerous layers of voxels may exist and topology scores may be assigned to respective voxels of the numerous layers.

As illustrated in FIG. 6, voxels representing an edge of a portion of the compound object 500 (e.g., an edge of the frame-like portion 502 and/or an edge of the oval-like portion 504) may have greater topology values than voxels representing other portions of the compound object 500 (e.g., interior voxels of the frame-like portion 502 and/or interior voxels of the oval-like portion 504). Stated differently, voxels representing portions of the object that are spatially close to an area that has a change in density, if density is being used to calculate the topology values, for example, may have larger topology values than voxels representing portions of the object with a substantially constant density.

In the illustrated example, voxels that have a topology range of six to seven 602 represent an edge of the oval-like portion 504 (where portions of the object represented by some of the neighboring voxels have a substantially different density), and voxels that have a topology range of two to three 604 represent an edge of the frame-like portion 502. Voxels that have a topology value in the range of fifteen to sixteen 606 represent background (e.g., these voxels do not represent the potential compound object), and thus the voxels have a density of zero. It will be appreciated that the topology values used herein are for simply example values. The actual topology values may vary from those used in this example.

It will be appreciated that test voxels that are surrounded by other voxels with densities similar to the test voxel (e.g., test voxels on the interior of the frame-like portion 502, the oval-like portion 504 and/or the background) may have lower topology values than the topology values of voxels that are adjacent on edge of the frame-like portion 502 and/or of the oval-like portion 504 because the densities of neighboring voxels are similar (e.g., the mean of the density of neighboring voxels minus the density of the test voxel will be very small). In the illustrated example, such "interior" voxels have a topology value of one.

The topology score map data may be used to yield image data indicative of one or more sub-objects from the image data indicative of the potential compound object (e.g., as described in the proceeding acts).

At 406, a distribution of object voxels (e.g., a distribution of data acquired from the voxels) is created using the topology score map data. The distribution may be a single or multivariate distribution with at least one variable, or axis, of the distribution indicative of the topology score map data. A second axis may be representative of the frequency, or height, of the distribution, and, where the distribution is a multivariate distribution, a third axis (e.g., and second variable) of the distribution may be indicative of another property of the potential compound object that is represented by the voxels, such as density and/or atomic number, for example. It will be appreciated that the number of variables and/or the properties used to generate the distribution are not limited to those herein described. For example, in another embodiment, a multivariate distribution may comprise three variables, respective variables indicative of topology score map data, density, and atomic number.

Figure 7:
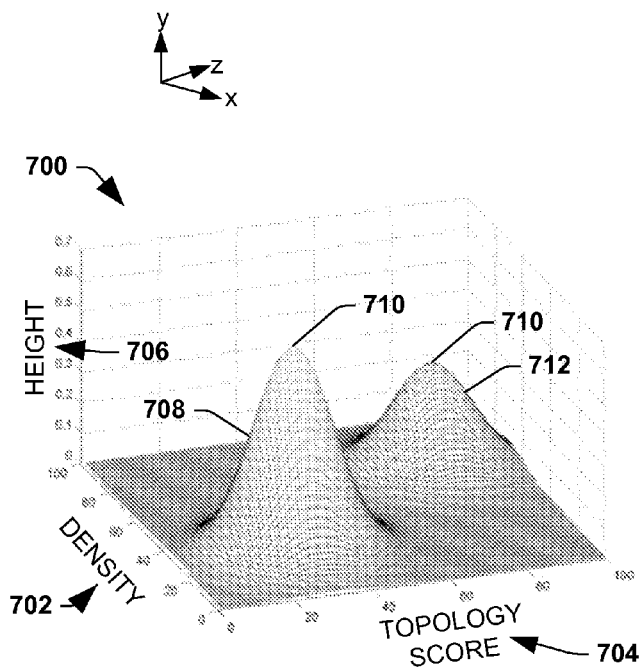
FIG. 7 illustrates a representation of a multivariate distribution.

FIG. 7 illustrates an example multivariate distribution 700 of object voxels. As depicted, the x-axis 702 represents densities of the potential object for various voxels, the z-axis 704 represents the topology score of the potential object for various voxels (e.g., based upon the topology score map data), and the y-axis 706 represents height (expressed in probability values) indicative of the probability that a voxel will have a given density and topology score based upon the frequency of voxels known to have the given particular density and topology score. Stated differently, the height is indicative of the number of voxels that have a given density and topology score (e.g., the greater the number of voxels with a given density and topology score, the more likely it is that another voxel, chosen at random, will also have the given density and topology score).

A hill 708 in the distribution 700 (topped off by a peak 710 indicative of a mode in the distribution) may be indicative of a sub-object. In the illustrated example, the distribution comprises a first hill 708 and a second hill 712, and thus the distribution may be indicative of two or less sub-objects. It will be appreciated that fewer than all of the hills may be indicative of sub-objects (e.g., hills with weak modes may be indicative of compositional changes in a single sub-object), and thus it is unknown (until the act performed at 410) whether both the first hill 708 and the second hill 712 are indicative of sub-objects.

Returning to FIG. 4, at 408, the distribution of object voxels is segmented to identify one or more modes in the distribution (e.g., a value that occurs more frequently in a given data set than other values) using analytic, iterative, or other mode identification techniques. In one example, a mean-shift type of algorithm or other statistical hill-climbing algorithm is used to identify modes in the distribution. Because hills in the distribution comprise a respective peak (e.g., 710 in FIG. 7), identifying modes allows hills that may be indicative of respective sub-objects (and are comprised of data from a plurality of voxels) to be identified.

At 410, modes that do not meet predetermined criteria are dissolved. For example, modes that do not fall within a predetermined height range, modes that do not meet a predetermined height threshold, and/or hills that are not indicative of data from a predetermined number of voxels may be dissolved. For example, returning to FIG. 7, a mode may be dissolved if there is not a change in the height (e.g., probability) of at least 0.1 from the bottom of the hills 708 or 712 to the mode, or peak 710, in the distribution 700. Thus, as illustrated in FIG. 7, neither the first hill 708 (and accompanying mode) nor the second hill 712 (and accompanying mode) would be dissolved.

Dissolving modes (and their accompanying hills) typically comprises deleting data that is represented by a mode and/or altering the data to cause the data to become part of an adjacent hill that is not being dissolved. In this way, (weak) modes that are not likely to be indicative of sub-objects (but rather a density fluctuation in a single object and/or an artifact in the image data indicative of the potential object, for example) are dissolved while (dominant) modes that are likely to be indicative of a sub-object are preserved. Thus, dissolving modes reduces the likelihood of more sub-objects being identified than actually exist in the potential compound object.

At 412, voxels of the three-dimensional image data indicative of the potential compound object are labeled, or relabeled (if the voxels were previously labeled during a three-dimensional segmentation to identify the potential compound object), using model association according to the identified modes (e.g., remaining after weak modes have been dissolved) in the distribution of object voxels to create image data indicative of one or more sub-objects (e.g., 158 in FIG. 1). Stated differently, the voxels of the potential compound object are generally labeled with the same label (e.g., an identification number identifying the potential compound object). After the distribution has been created and modes have been identified, the voxels may be relabeled so that some of the voxels have a first label and some of the voxels have a second label, respective labels corresponding to a sub-object of the potential compound object. It will be appreciated that where only a single sub-object is identified based upon the modes in the distribution (e.g., the potential compound object is not a compound object) the voxels may not be relabeled.

In one embodiment, model association comprises comparing properties of the potential compound object that are represented by a first voxel to the distribution and identifying a point in the distribution that corresponds to the properties. The voxel may then by assigned a label corresponding to the label given to the mode and its accompanying hill wherein the identified point resides. For example, if the properties represented by the first voxel correspond to a point comprised within the first hill, the first voxel may be given a label that is assigned to the first hill. In this way, voxels included in the image data indicative of the potential compound object (e.g., 156 in FIG. 1) become the voxels of the image data indicative of one or more sub-objects (e.g., 158 in FIG. 1).

At 414, a first voxel having a first label (e.g., assigned at act 412) is relabeled if the first voxel is not within a predetermined geometric proximity (e.g., based upon connectivity analysis) of a cluster of voxels that have the first label. Stated differently, a voxel that was assigned a first label based upon the density and/or a topology value of the portion of the object that the voxel is representing may be reassigned a second, different label if the voxel is not within a predetermined geometric range of a first cluster of voxels that are also assigned the first label. For example, the voxel may be reassigned a second, different label if the voxel is not adjacent to a predetermined number of voxels that are assigned the first label. The label that is reassigned to the voxel may be a background label (e.g., so that the data from the voxel is ignored) or it may be relabeled with a label assigned to voxels that are within a predetermined geometric proximity of the voxel (e.g., the voxel is assigned a label corresponding to the label given to a second cluster of voxels that is labeled differently from the first cluster of voxels).

Figure 8:
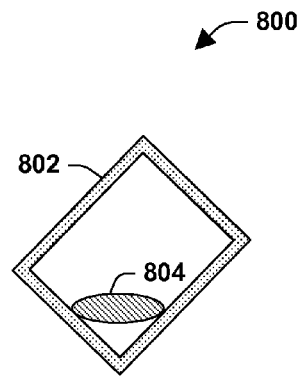
FIG. 8 is a graphical representation of image data indicative of one or more sub-objects.

FIG. 8 is an illustration of image data of one or more sub-objects 800 (e.g., sub-objects of the potential compound object 500 in FIG. 5). As illustrated, the acts described herein caused the image data indicative of a potential compound object to be identified as two sub-objects, a frame-like object 802 (shaded in dots) and an oval-like object 804 (shaded in stripes).

Returning to FIG. 4, the method ends at 416.

Figure 9:
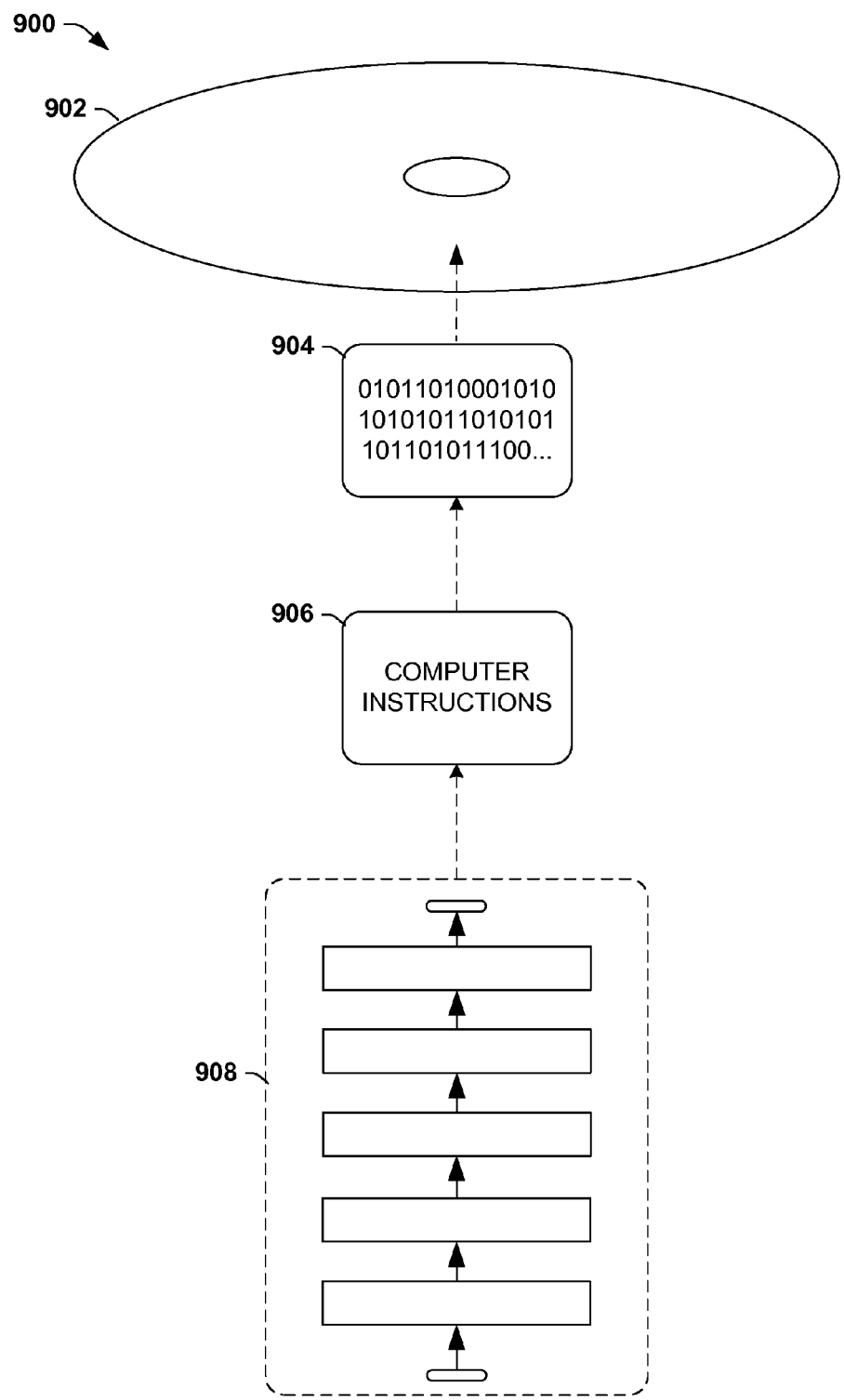
FIG. 9 is an illustration of an example computer-readable medium comprising processor-executable instructions configured to embody one or more of the provisions set forth herein.

Still another embodiment involves a computer-readable medium comprising processor-executable instructions configured to implement one or more of the techniques presented herein. An example computer-readable medium that may be devised in these ways is illustrated in FIG. 9, wherein the implementation 900 comprises a computer-readable medium 902 (e.g., a CD-R, DVD-R, or a platter of a hard disk drive), on which is encoded computer-readable data 904. This computer-readable data 904 in turn comprises a set of computer instructions 906 configured to operate according to one or more of the principles set forth herein. In one such embodiment 900, the processor-executable instructions 906 may be configured to perform a method, such as the example method 400 of FIG. 4, for example. In another such embodiment, the processor-executable instructions 906 may be configured to implement a system, such as at least some of the exemplary scanner 100 of FIG. 1, for example. Many such computer-readable media may be devised by those of ordinary skill in the art that are configured to operate in accordance with one or more of the techniques presented herein.

Moreover, the words "example" and/or "exemplary" are used herein to mean serving as an example, instance, or illustration. Any aspect, design, etc. described herein as "example" and/or "exemplary" is not necessarily to be construed as advantageous over other aspects, designs, etc. Rather, use of these terms is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for splitting a compound object, comprising:
using a distribution based off of topology score map data to yield image data indicative of one or more sub-objects from image data indicative of a potential compound object, the topology score map data corresponding to a set of topology scores, a first topology score of the set describing a first probability that a first voxel of the image data indicative of a potential compound object is associated with an object shape and a second topology score of the set describing a second probability that a second voxel of the image data indicative of a potential compound object is associated with the object shape.

2. The method of claim 1, wherein the object shape relates to thickness.

3. The method of claim 1, wherein the set of topology scores are plotted along a first axis of the distribution.

4. The method of claim 3, wherein the distribution is a multivariate distribution.

5. The method of claim 3, wherein a set of density values are plotted along a second axis of the distribution.

6. The method of claim 1, comprising identifying modes in the distribution.

7. The method of claim 6, comprising labeling at least one of the first voxel or the second voxel according to the identified modes in the distribution to generate the image data indicative of one or more sub-objects.

8. The method of claim 7, comprising, before labeling, dissolving a first mode of the modes that does not meet predetermined criteria.

9. The method of claim 1, wherein the distribution is a multivariate distribution, wherein a first variable of the multivariate distribution is indicative of topology and a second variable is indicative of a property of the potential compound object other than topology.

10. The method of claim 4, comprising labeling the first voxel according to a first label assigned to a corresponding mode in the multivariate distribution to generate the image data indicative of one or more sub-objects.

11. The method of claim 10, comprising relabeling the first voxel when the first voxel is not within a geometric proximity of a cluster of voxels that have the first label.

12. The method of claim 1, wherein the image data indicative of a potential compound object is three-dimensional.

13. An apparatus for compound object splitting, comprising:
   a distribution component configured to generate a statistical distribution of voxels using topology score map data derived from image data indicative of a potential compound object under examination, the topology score map data corresponding to a set of topology scores, a first topology score of the set describing a first probability that a first voxel of the voxels is associated with an object shape and a second topology score of the set describing a second probability that a second voxel of the voxels is associated with the object shape;
   a segmentation component configured to identify modes in the statistical distribution; and
   a relabeler component configured to label the first voxel according to a label assigned to an identified mode of the modes that corresponds to the first voxel to generate image data indicative of one or more sub-objects.

14. The apparatus of claim 13, comprising a topology mapping component configured to generate the topology score map data from the image data indicative of a potential compound object.

15. The apparatus of claim 13, comprising a first refinement component configured to dissolve a first mode of the modes in the statistical distribution that does not meet predetermined criteria.

16. The apparatus of claim 13, comprising a second refinement component configured to relabel the first voxel when the first voxel is not within a geometric proximity of a cluster of voxels that are labeled with the label.

17. The apparatus of claim 13, wherein the set of topology scores are plotted along a first axis of the statistical distribution and a set of density values are plotted along a second axis of the statistical distribution.

18. A method for splitting compound objects, comprising:
   generating topology score map data from three-dimensional image data indicative of a potential compound object, the topology score map data corresponding to a set of topology scores, a first topology score of the set describing a first probability that a first voxel of the three-dimensional image data is associated with an object shape and a second topology score of the set describing a second probability that a second voxel of the three-dimensional image data is associated with the object shape;
   creating a multivariate distribution of voxels using at least the topology score map data;
   segmenting the multivariate distribution of voxels to identify modes in the multivariate distribution; and
   labeling the first voxel according to a first label assigned to a first mode of the modes corresponding to the first voxel to create three-dimensional image data indicative of one or more sub-objects.

19. The method of claim 18, comprising relabeling the first voxel when the first voxel is not within a geometric proximity of a cluster of voxels that have the first label.

20. A computer readable storage device comprising instructions that when executed via a processor perform the method of claim 18.

* * * * *